United States Patent Office 3,503,771
Patented Mar. 31, 1970

3,503,771
SYNTHETIC AGGREGATE MATERIAL AND A
PROCESS FOR PRODUCING SAME
Karl Kristian Kobs Kroyer, Vestre Kongevej 80, Viby, Jutland, Denmark
No Drawing. Filed July 18, 1967, Ser. No. 654,094
Int. Cl. C08h 17/04, 17/68
U.S. Cl. 106—288                                 6 Claims

ABSTRACT OF THE DISCLOSURE

A synthetic aggregate material useful in rod surface coatings comprises nodules of small bodies of devitrified glass, hydraulically set cement and a pigment. The aggregate material is produced by adding a mixture of cement and pigment to moistened small bodies of devitrified glass while stirring after which the resultant mixture is placed on a moving surface to produce nodules which are removed upon reaching a predetermined size.

---

This invention relates to a synthetic aggregate material which is particularly suitable for use in moldable road surface coatings.

In recent years a need has arisen of making road surface coatings in colors other than the black-white shades hitherto used, partly for aesthetic purposes and partly for the purpose of directing the through traffic through urban areas where it is difficult to place road signs in a sufficiently conspicuous manner. Such directing of the traffic may e.g. be obtained by providing differently colored guiding strips or lanes in the road surface coating.

One way of providing colored asphalt containing road surface coatings or parts thereof, such as traffic strips is to use colored asphalt. However, this solution has the drawback that the color effect obtained will be relatively slight, because the asphalt which constitutes the binder of the asphalt road surface coatings amounts to only about 10% of the coating. Moreover, a great proportion of the relatively soft asphalt is removed by wear so that the color vanishes in a relatively short time.

It has also been attempted to use colored natural materials as aggregate materials in the construction of roads. This solution has not been satisfactory either, because it has been very difficult to find materials having the desired combination of strength and color.

Since the aggregate materials most commonly used for asphalt road surface coatings, such as granite, calcinated flint and devitrified glass, are not directly susceptible to coloring, it has been considered to color these materials by providing them with a colored glaze. However, the use of a glazed aggregate material for road surface coatings or for the coating of other surfaces that are subjected to heavy influences in the form of wear, blows and great variations of temperature is not satisfactory because the brittle glaze may easily burst off the base material whereby the color effect is lost. Moreover, the glazing is a both time consuming and expensive process because it requires heating to high temperatures.

It is the object of the invention to provide an inexpensive wear-resistant colored aggregate material.

With this object in view, according to the invention, an aggregate material is provided which consists of nodules of small bodies of devitrified glass, hydraulically set cement and a pigment. The color effect obtained with the aggregate material according to the invention is produced by the pigment which is uniformly distributed in the cement mass, which serves to unite the small bodies of devitrified glass in the form of nodules. Consequently, the aggregate material is not colored on the surface alone so that the color effect is maintained even if the material is worn down or crushed under heavy impacts. The pigment is preferably a finely ground insoluble inorganic pigment, which in the production of the aggregate material is thoroughly mixed with cement before a nodule formation is performed. Therefore, pigments may be chosen within a wide range, and the aggregate material according to the invention may therefore be produced with a wide variety of different colors.

Examples of pigments that may be used in the aggregate material are metal oxides, such as iron oxides, chromium oxides, and cobalt and titanium nickel compounds.

Instead of producing the colored cement in conjunction with the production of the nodules, commercial colored cement, which normally consists of a white cement with a pigment admixed thereto, may be used.

Since the devitrified glass is ordinarily a white material relatively small amounts of pigment will suffice for covering the color of this material so as to give the aggregate material the desired color.

The small bodies of devitrified glass have in themselves a high mechanical strength, and since the set cement has also good strength properties, the nodules formed of both will have a great resistance to mechanical influences. An important factor attributing for the good strength properties of the nodules is that fact that the small bodies of devitrified glass have sharp edges and will therefore tend to be thoroughly interengaged during the nodule formation.

The sharp edges of the bodies of devitrified glass are also of importance in the case where the aggregate material is to be used in road surface coatings because the nodules will have a rough sandpaper-like surface as a consequence of larger or smaller grains of devitrified glass protruding from the surface. When the nodules have been incorporated in a road surface coating and the asphalt surrounding the nodules has been removed by the wear resulting from traffic, the nodules will give the road surface a rough character and the multitude of grains of devitrified glass protruding from the nodules will make the nodules unpolishable and will thereby ensure good frictional properties of the road surface coating. Moreover, the nodules are capable of breaking the water film which is formed on the road surface in moist weather.

The aggregate material according to the invention has also a good resistance to the chemical influences, to which it may be subjected when incorporated in materials used in the atmosphere.

The small bodies of devitrified glass may have a particle size of 0–2 mm., and the ultimate nodules are preferably made with a grain size of from 4–12 mm., this range having been found particularly suitable for use in road surface coatings. However, for special purposes it may be desirable to produce even greater nodules.

According to a preferred embodiment of the aggregate material according to the invention, the small bodies of devitrified glass are made by quenching of molten glass. It has been found that the glass particles formed in this manner have to a considerable extent basically a cubic shape. This cubic shape is particularly suitable for the material according to the invention, because the small bodies will then have a great number of sharp edges further contributing to the advantages mentioned above.

The weight ratio of devitrified glass to cement is preferably about 2:1, but higher or lower proportions may be used according to the requirements in each individual case. The amount of water used is preferably about .4–.45 kg. per kg. cement, whereby the cement will have the highest possible strength and the lowest possible porosity. This proportion may, however, be changed according to the requirements in each individual case, and it is further possible to replace part of the water by an acrylic polymer emulsion, e.g. the acryl emulsions which are sold under the trade names Primal MC 4530 Vinacryl 4040 and Lasbeton universal acryl.

By introducing an acrylic polymer emulsion into the aggregate material according to the invention instead of part of the water a higher impact strength may be obtained.

The pigment is preferably used in an amount from 2 to 10% by weight of the cement.

The invention also relates to a process for producing an aggregate material of the kind mentioned. According to this process, small bodies of devitrified glass are moistened with water, a mixture of cement and pigment is added while at the same time stirring, and the product thereby formed is placed on a moving surface for the production of nodules, the nodules thus formed being removed from the moving surface when they have reached the desired size.

During the stay on the moving surface, a nodule formation takes place by virtue of the so-called snow-ball-effect, i.e. small bodies of devitrified glass and cement with pigment added thereto will continue to adhere to the surface of the agglomerates of moistened small bodies of devitrified glass and cement first formed.

The nodule formation is preferably effected on the inner face of a drum rotating about a horizontal axis or on the inner side of a horizontally disposed container performing a reciprocating movement.

After the nodules have been formed, these may be introduced into a chamber containing moist air or be stored in water. Alternatively they may be subjected to autoclave treatment to promote setting.

The invenion will now be further illustrated with reference to an example indicating various embodiments of the aggregate material according to the invention and one embodiment of the method of making said material.

EXAMPLE

A series of aggregate materials were made from the components listed in the table below. The process was carried out as follows: Water was added to a dry mass of small bodies of devitrified glass so that the latter was slightly moistened and then a mixture of cement and pigment was sprinkled onto the moistened small bodies while at the same time stirring. The mixture thus formed was introduced into a rotating container whereby nodules were formed. The nodules were stored for 28 days in water at a temperature of 18° C. and were then placed on trays for drying in the air at 18° C. for three days.

Finally, the nodules thus formed were subjected to a test for determining the crushing-down figure of the nodules as follows: A sample of 500 g. of the material having a grain size of 5–7 mm. was subjected to 20 impacts from a drop-hammer. Thereafter the material was sieved through sieves having mesh sizes of 5, 4, 3, 2 and 1 mm. respectively. The quantities of material passing through the sieve of 1 mm. mesh size and the quantities of material retained on the sieves having the mesh sizes 1, 2, 3, and 4 respectively were weighed and expressed in percentages of the starting material. These percentages are designated A, B, C, D, and E and the crushing-down figure N is determined by the equation $$N = 5A + 4B + 3C + 2D + E$$

The results obtained will be apparent from the below table.

Composition and crushing down figure of various aggregate materials according to the invention.

| Test No. | Composition | Crushing-down figure |
|---|---|---|
| 1 | 1 kg. white cement, 2 kg. devitrified glass (particle size 1-2 mm.), .05 kg. yellow pigment, 0.44 kg. water | 35 |
| 2 | 1 kg. white cement, 2 kg. devitrified glass (particle size 1-2 mm.), .10 kg. green pigment, .44 kg. water | 53 |
| 3 | 1 kg. white cement, 2 kg. devitrified glass (particle size 1-2 mm.), .05 kg. blue pigment, .44 kg. water | 42 |
| 4 | 1 kg. red cement, 2 kg. devitrified glass (particle size 1-2 mm.), .44 kg. water | 56 |
| 5 | 1 kg. green cement, 2 kg. devitrified glass (particle size 1-2 mm.), .44 kg. water | 51 |
| 6 | 1 kg. red cement, 2 kg. devitrified glass (particle size 1-2 mm.), .2 kg. Primal MC4530 .25 kg. water | 18 |
| 7 | 1 kg. red cement, 2 kg. devitrified glass (particle size 1-2 mm.), .1 kg. Vinacryl 4040, .32 kg. water | 27 |
| 8 | 1 kg. red cement, 2 kg. devitrified glass (particle size 1-2 mm.), .05 kg. Lasbeton universal acryl, .41 kg. water | 35 |

It will be apparent from the above results that the nodules forming the aggregate material according to the invention have a high impact strength. By way of comparison the devitrified glass material marketed under the trade name Synopal has a crushing-down figure of 20–35.

It will also be seen that the replacing part of the water by an acrylic polymer emulsion, a lower crushing-down figure, i.e. a higher impact strength, is obtained.

What I claim is:

1. A synthetic aggregate material particularly for use in moldable road surface coatings comprising a major proportion of nodules of small bodies of devitrified glass and minor proportions of hydraulically set cement and pigment.

2. A process as in claim 6 wherein the small bodies of devitrified glass are produced by quenching of molten glass.

3. A synthetic aggregate material according to claim 1, wherein the weight ratio of devitrified glass to cement is about 2:1.

4. A synthetic aggregate material according to claim 1 wherein said pigment is present in an amount of from about 2 to 10% by weight based on the weight of cement.

5. A synthetic aggregate material according to claim 1 wherein the nodules have a grain size of 4–12 mm.

6. A process for producing an aggregate material comprising the steps of moistening small bodies of devitrified glass with water, adding a mixture of cement and pigment while at the same time stirring, placing the product thus obtained on said moving surface to produce nodules, and removing said nodules from said moving surface after they have reached a desired size.

References Cited

UNITED STATES PATENTS

| | | | |
|---|---|---|---|
| 3,073,708 | 1/1963 | Kroyer | 106—97 |
| 3,311,686 | 3/1967 | Christy | 264—117 |

JAMES E. POER, Primary Examiner

U.S. Cl. X.R.

106—64, 97